United States Patent
Sharma et al.

(10) Patent No.: US 9,051,711 B2
(45) Date of Patent: Jun. 9, 2015

(54) PATH DETECTION-BASED STEERING COMMAND FILTERING METHOD FOR MOTOR GRADER AUTOMATIC ARTICULATION FEATURE

(71) Applicant: Caterpillar Inc., Peoria, IL (US)

(72) Inventors: Amit Sharma, Peoria, IL (US); Eric C. Hughes, Metamora, IL (US); Steven C. Budde, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 14/019,098

(22) Filed: Sep. 5, 2013

(65) Prior Publication Data

US 2015/0066298 A1    Mar. 5, 2015

(51) Int. Cl.
| | |
|---|---|
| *B62D 6/00* | (2006.01) |
| *B62D 11/02* | (2006.01) |
| *B62D 57/00* | (2006.01) |
| *E02F 9/20* | (2006.01) |
| *E02F 9/08* | (2006.01) |
| *E02F 3/76* | (2006.01) |

(52) U.S. Cl.
CPC ............ *E02F 9/2087* (2013.01); *E02F 9/0841* (2013.01); *E02F 3/7663* (2013.01); *B62D 57/00* (2013.01); *B62D 11/02* (2013.01)

(58) Field of Classification Search
CPC ........... B62D 6/00; B62D 11/02; B62D 57/00
USPC ................. 701/41, 42; 180/6.2, 7.1
See application file for complete search history.

(56) References Cited

U.S. PATENT DOCUMENTS

| | | |
|---|---|---|
| 5,517,413 A | 5/1996 | Rauner |
| 6,691,008 B2 | 2/2004 | Kondo et al. |
| 7,412,315 B2 | 8/2008 | Wildey et al. |
| 2006/0042838 A1* | 3/2006 | Yeoman et al. ............... 180/6.2 |
| 2008/0208461 A1* | 8/2008 | Gharsalli et al. ............. 701/209 |
| 2008/0257629 A1* | 10/2008 | Olsson ......................... 180/197 |
| 2011/0035109 A1* | 2/2011 | Ryerson et al. ............... 701/42 |
| 2011/0202238 A1* | 8/2011 | Cebon et al. ................. 701/41 |

* cited by examiner

*Primary Examiner* — Fadey Jabr
*Assistant Examiner* — Yazan A Soofi
(74) *Attorney, Agent, or Firm* — Miller, Matthias & Hull LLP

(57) ABSTRACT

An apparatus and method are provided for operating a motor grader having steerable front wheels and a front and rear frame pivotally connected at an articulation joint. The method includes selecting an automatic articulation mode, and commanding front wheel steering to turn the motor grader, providing a plurality of front wheel steering corrections to an electronic controller, filtering the plurality of front wheel steering corrections using a method for filtering steering corrections based on the constant curve mode, wherein the method generates filtered front wheel steering corrections, and automatically commanding articulation of the front frame relative to the rear frame about the articulation joint in response to the filtered front wheel steering corrections.

20 Claims, 9 Drawing Sheets

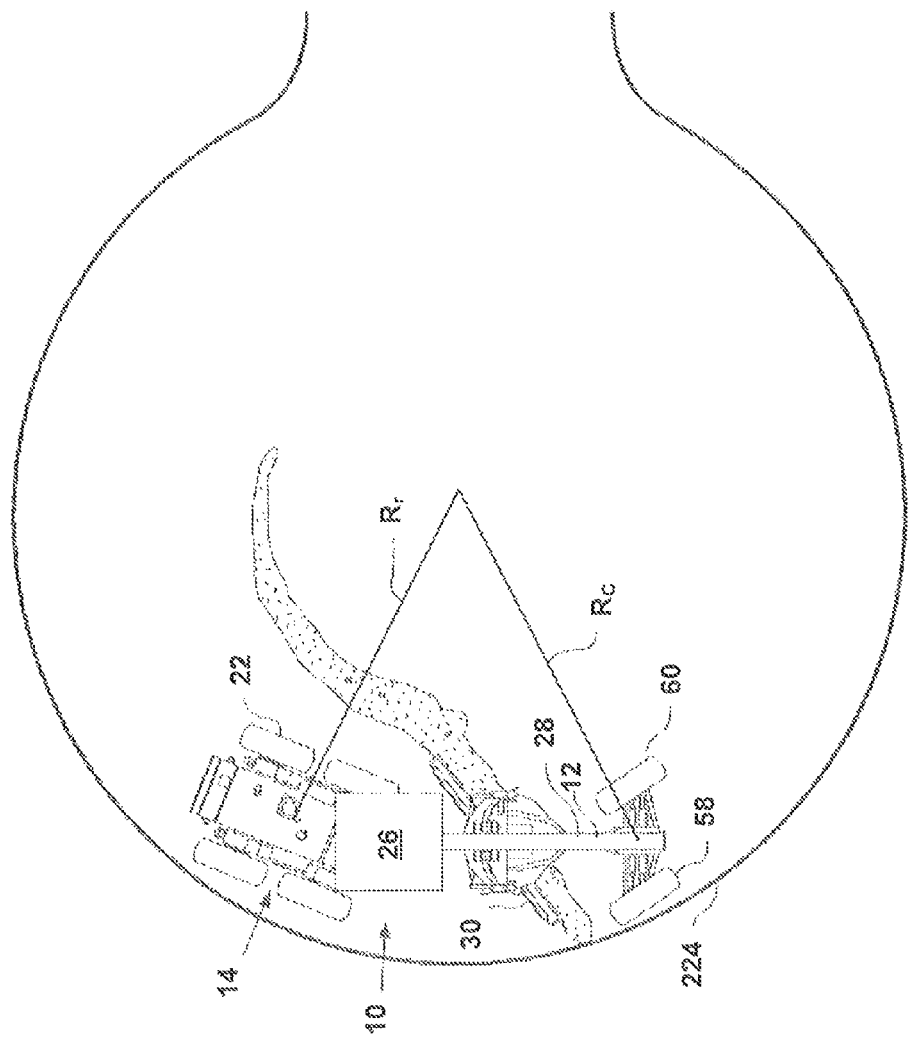

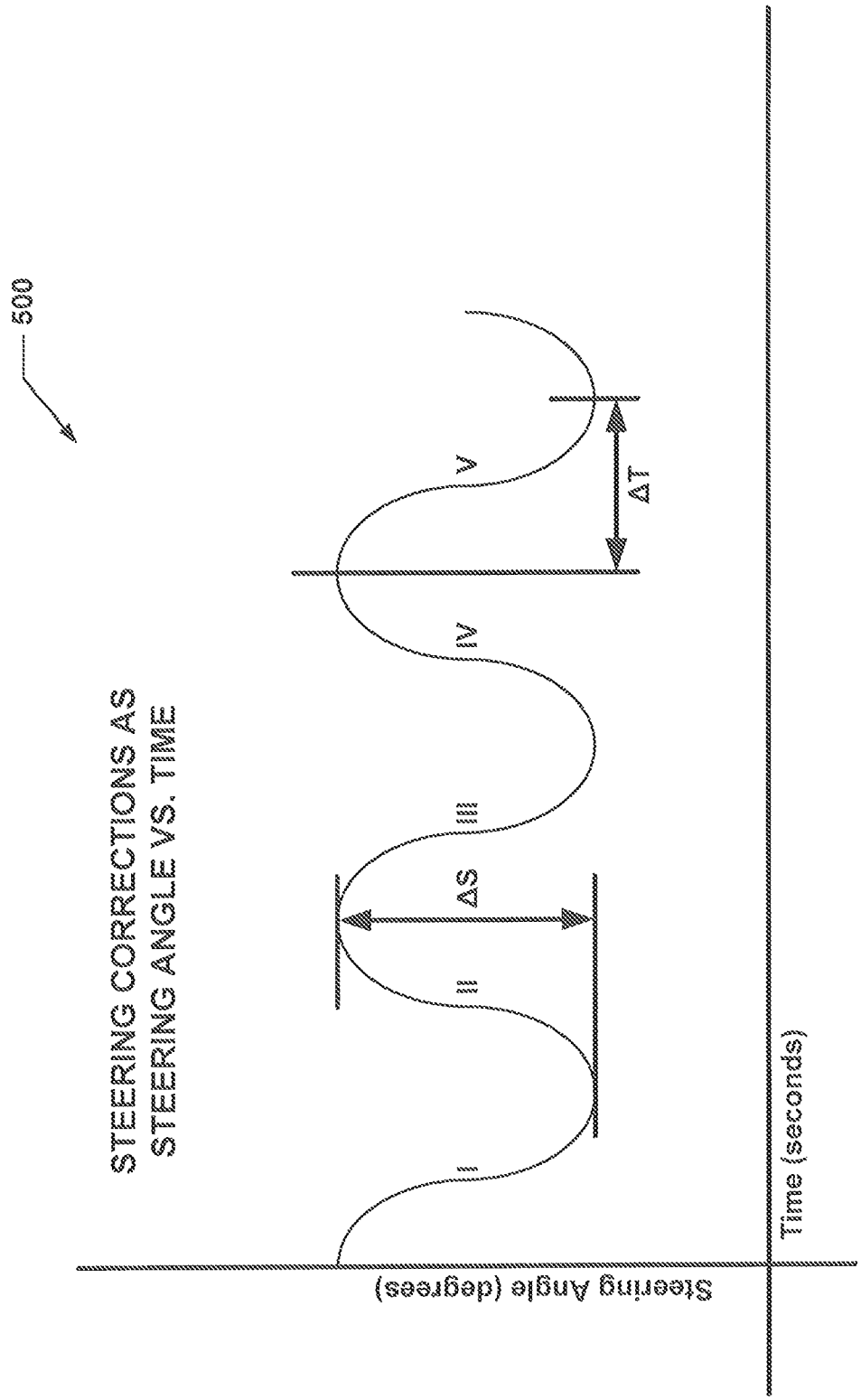

PATH DETECTION-BASED STEERING COMMAND FILTERING METHOD FOR MOTOR GRADER AUTOMATIC ARTICULATION FEATURE

TECHNICAL FIELD OF THE DISCLOSURE

The present disclosure generally relates to motor graders and, more particularly, relates to a system and method for automatically controlling articulation of a motor grader.

BACKGROUND OF THE DISCLOSURE

A motor grader is a versatile apparatus for road work, ditch work, site preparation and other surface contouring and finishing tasks. The versatility of a motor grader is provided in large part by its multiple course setting and course change options. In particular, a motor grader typically includes a steering function implemented via steerable ground engaging wheels while also allowing some degree of course correction or steering via lateral arching or articulation of the machine frame. In this manner, for example, a motor grader may be steered and articulated to follow a curve without driving the rear wheels across the area inside the curve and disturbing the just graded area.

As should be recognized from the above, motor graders are complex pieces of heavy machinery and are operatively complex. Controlling a motor grader includes numerous hand-operated controls to steer the front wheels, position the blade, control articulation, control auxiliary devices such as rippers and plows, and various displays for monitoring machine conditions and/or functions. Control of a motor grader requires highly skilled and focused operators to position the blade while controlling steering, particularly when performing curved path grading and cul-de-sac grading.

For example, in cul-de-sac grading, the operator is required to maneuver the motor grader around a substantially circular path while maintaining the blade at a desired distance from curbs and other obstacles. This requires that operators simultaneously control the blade, front wheel steering, and articulation. Failure to properly control articulation in such instances results in the front and rear portions of the machine following separate travel paths, which can cause obstacle collisions or incomplete grading requiring multiple passes.

While there are certain automatic steering solutions described for use in motor graders, these solutions do not solve the problem of maintaining proper articulation control in constant curve grading. For example, U.S. Patent Application Publication 2011/0035109 ("Steering System with Automated Articulation Control") describes a system wherein machine articulation is automatically controlled based on machine steering. The system of the '109 application adjusts machine articulation to follow steering angles and commands, thereby maintaining tracking between the front and rear wheels of the machine.

However, when using automated articulation controls, guiding a motor grader on cul-de-sac paths or other curved paths (e.g., an "S-Curve" path) requires an operator to give small steering corrections to maintain the course of the machine. As a result of the automated articulation controls, the articulation often reacts to the small steering corrections in an undesirable manner. For example, the small steering corrections may cause the articulation to jerk or wiggle undesirably with every small steering correction. A need therefore exists to filter articulation movements for small to medium steering corrections associated with, for example, a cul-de-sac path while also avoiding filtering steering corrections when the machine is making turns.

SUMMARY OF THE DISCLOSURE

In accordance with one aspect of the present disclosure, a method is provided for operating a motor grader having steerable front wheels and a front and rear frame pivotally connected at an articulation joint. The method includes selecting an automatic articulation mode, the automatic articulation mode having a constant curve mode. The method further includes propelling the motor grader along a direction of travel, commanding front wheel steering to turn the motor grader, and providing a plurality of front wheel steering corrections to an electronic controller. The method further includes filtering the plurality of front wheel steering corrections using a method for filtering steering corrections based on the constant curve mode, wherein the method generates filtered front wheel steering corrections, and automatically commanding articulation of the front frame relative to the rear frame about the articulation joint in response to the filtered front wheel steering corrections.

In accordance with another aspect of the present disclosure, a method is provided for filtering a plurality of front wheel steering corrections associated with a motor grader, the method associated with an electronic controller associated with the motor grader, the electronic controller configured to control the motor grader in an automatic articulation mode, wherein the automatic articulation mode comprises a constant curve mode. The method includes receiving n front wheel steering corrections from the plurality of front wheel steering corrections, determining if an angular measure for each of the n front wheel steering corrections from the plurality of front wheel steering corrections are within an acceptable steering correction angular range associated with the constant curve mode, and determining if a timespan of each member of the n front wheel steering corrections from the plurality of front wheel steering corrections are within an acceptable timespan range associated with the constant curve mode.

In accordance with yet another aspect of the present disclosure, a motor grader is provided having an automatic articulation mode including a constant curve mode. The motor grader includes one or more steerable front wheels mounted on a front portion of the motor grader, one or more steerable wheels attached to a rear portion of the motor grader that may be articulated relative to the front position, and a controller configured for receiving a plurality of front wheel steering corrections and in response generating a steering correction to steer the one or more front wheels, wherein the plurality of front wheel steering corrections are filtered using a method for filtering steering corrections based on a constant curve mode, wherein the method generates filtered front wheel steering corrections, and automatically commanding articulation of the one or more steerable wheels attached to the rear portion in response to the filtered front wheel steering corrections.

Other features and advantages of the disclosed systems and principles will become apparent from reading the following detailed disclosure in conjunction with the included drawing figures.

BRIEF DESCRIPTION OF THE DRAWINGS

FIG. 8 is a schematic top view of a motor grader operation employing a steering control system in accordance with the present disclosure.

FIG. 9 is a graphical representation of exemplary steering correction edge detection for one embodiment of the present disclosure.

DETAILED DESCRIPTION OF THE DISCLOSURE

The present disclosure provides a system and method for enabling a motor grader operator to maintain smooth operation on a constant curved path when using an automatic articulation system associated with the motor grader. In particular, the system and method may employ a steering filter which will intelligently decide when to turn "ON" and "OFF" to remove small to medium steering corrections in a cul-de-sac or in other curves while avoiding delay when the machine is making a turn.

For motor grader operation in which the operator gives small steering angle corrections which lie in an accepted region, a control system will count and store maximum steering correction angle values for every steering angle correction. In an embodiment, after n number of accepted steering angle corrections are observed consecutively, the system will determine that the operator is making small steering angle corrections associated with a constant curve (i.e., a cul-de-sac, an "S" curve, etc.) rather than making a steering angle correction associated with a turn or change of direction; this will result in the control system entering a constant curve mode (CCM). In constant curve mode, the system will filter small steering corrections (e.g., corrections of 5-12 degrees); as a result, the articulation will not move for every small steering correction. The constant curve mode will measure "n" number consecutive steering corrections; using the n steering corrections, the constant curve mode may set the steering angle to the average angular value of the n steering corrections. As soon as a large steering angle correction is observed and/or a time threshold is crossed for a particular steering angle correction, the system will determine that either the machine is taking a turn or it is slowly trying to change course and, as a result, the control system will exit constant curve mode.

Figure 1:
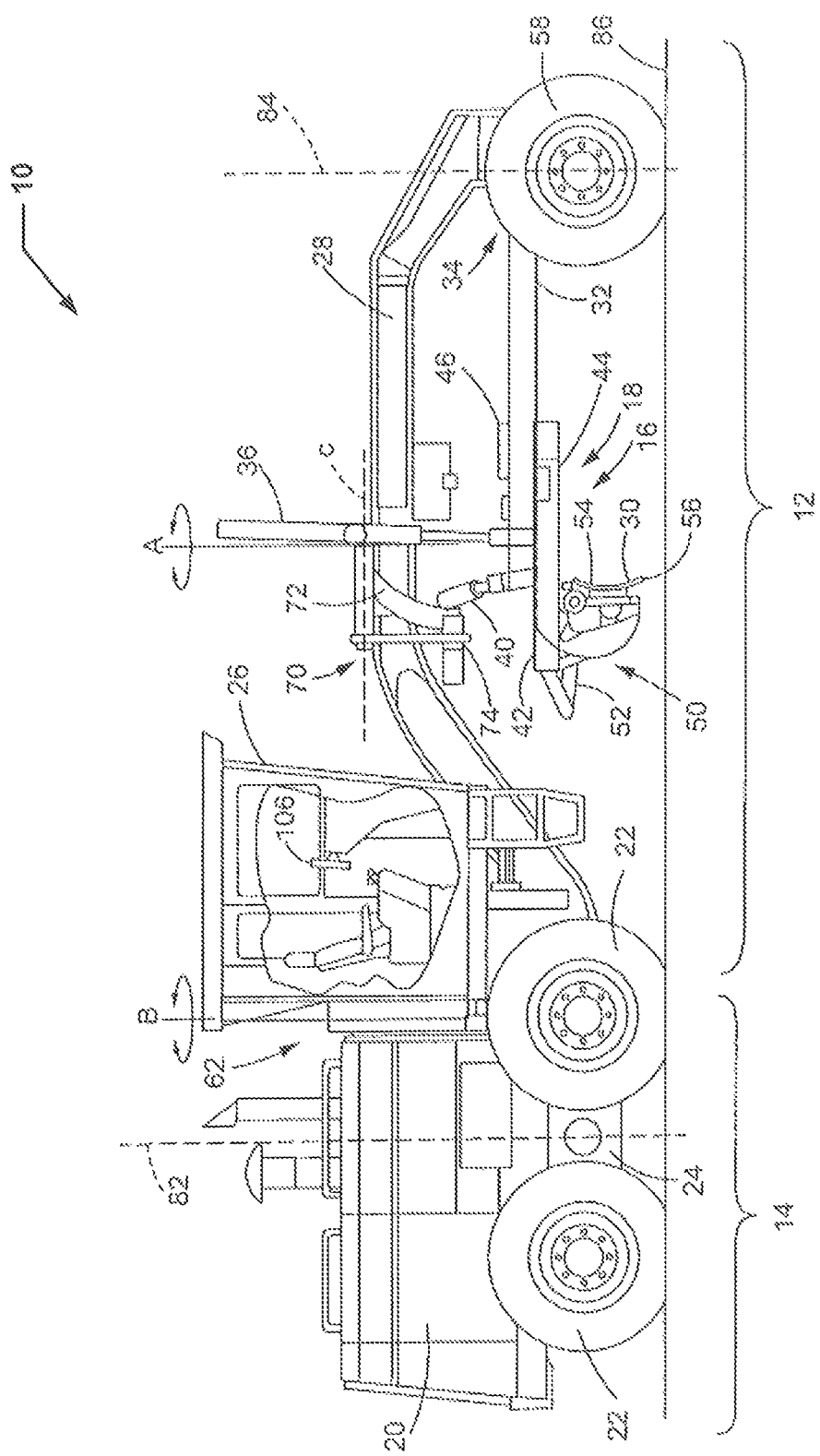
FIG. 1 is a side view of a motor grader constructed in accordance with the present disclosure.

Having discussed example embodiments in overview, we turn now to detailed descriptions of certain embodiments. FIG. 1 is a schematic side view of a motor grader in accordance with one embodiment of the present disclosure. The motor grader 10 includes a front frame 12, rear frame 14, and a work implement 16, e.g., a blade assembly 18, also referred to as a drawbar-circle-moldboard assembly (DCM). The rear frame 14 includes a power source (not shown), contained within a rear compartment 20, that is operatively coupled through a transmission (not shown) to rear traction devices or wheels 22 for primary machine propulsion.

As shown, the rear wheels 22 are operatively supported on tandem axles 24 which are pivotally connected to the machine between the rear wheels 22 on each side of the motor grader 10. The power source may be, for example, a diesel engine, a gasoline engine, a natural gas engine, or any other engine known in the art. The power source may also be an electric motor linked to a fuel cell, capacitive storage device, battery, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

The front frame 12 typically supports an operator station 26 that contains operator controls, along with a variety of displays or indicators used to convey information to the operator, for primary operation of the motor grader 10. The front frame 12 may also include a beam 28 that supports the blade assembly 18 and which is employed to move the blade 30 to a wide range of positions relative to the motor grader 10. The blade assembly 18 includes a drawbar 32 pivotally mounted to a first end 34 of the beam 28 via a ball joint (not shown) or the like. The position of the drawbar 32 is typically controlled by hydraulic cylinders: a right lift cylinder 36 and left lift cylinder 38 (FIG. 2) that control vertical movement, and a center shift cylinder 40 that controls horizontal movement. The right and left lift cylinders 36, 38 are connected to a coupling 70 that includes lift arms 72 pivotally connected to the beam 28 for rotation about axis C. A bottom portion of the coupling 70 may have an adjustable length horizontal member 74 that is connected to the center shift cylinder 40.

Figure 2:
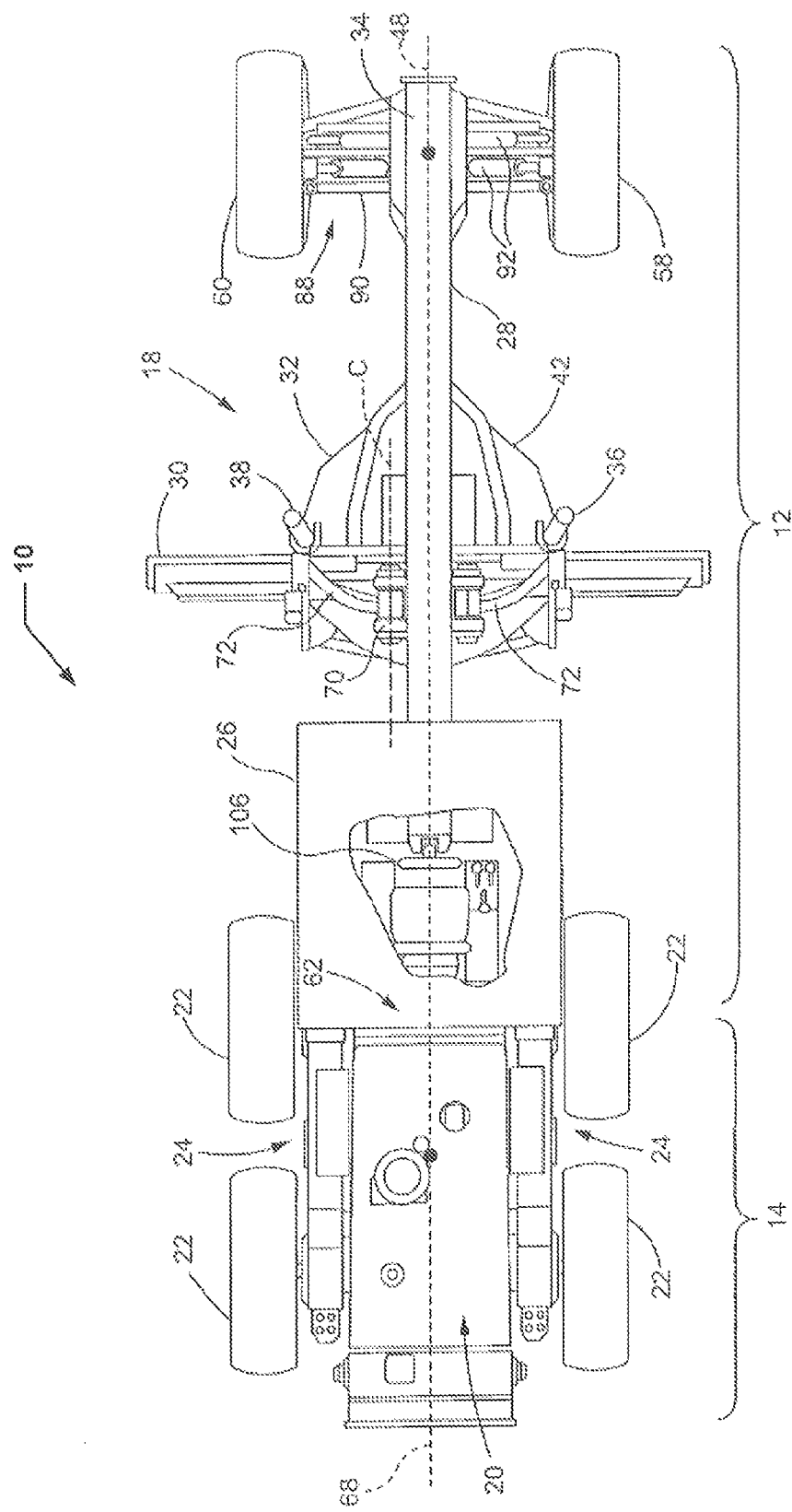
FIG. 2 is a top view of the motor grader of FIG. 1.

The drawbar 32 may include a large, flat plate, commonly referred to as a yoke plate 42. Beneath the yoke plate 42 is a circular gear arrangement and mount, commonly referred to as the circle 44. The circle 44 is rotated by, for example, a hydraulic motor referred to as the circle drive 46. Rotation of the circle 44 by the circle drive 46 rotates the attached blade 30 about an axis A perpendicular to a plane of the drawbar yoke plate 42. The blade cutting angle is defined as the angle of the work implement 16 relative to a longitudinal axis 48 of the front frame 12. For example, at a zero degree blade cutting angle, the blade 30 is aligned at a right angle to the longitudinal axis 48 of the front frame 12 and beam 28 (FIG. 2).

The blade 30 is also mounted to the circle 44 via a pivot assembly 50 that allows for tilting of the blade 30 relative to the circle 44. A blade tip cylinder 52 is used to tilt the blade 30 forward or rearward. In other words, the blade tip cylinder 52 is used to tip or tilt a top edge 54 relative to the bottom cutting edge 56 of the blade 30, which is commonly referred to as a blade tip. The blade 30 is also mounted to a sliding joint associated with the circle 44 that allows the blade 30 to be slid or shifted from side-to-side relative to the circle 44. The side-to-side shift is commonly referred to as blade side shift. A side shift cylinder (not shown) or the like is used to control the blade side shift.

Motor grader steering is accomplished through a combination of both front wheel steering and machine articulation. As shown in FIG. 2, steerable traction devices, such as right and left wheels 58, 60, are associated with the first end 34 of the beam 28. Wheels 58, 60 may be both rotatable and tiltable for use during steering and leveling of a work surface 86 (FIG. 1). Front wheels 58, 60 are connected via a steering apparatus 88 that may include a linkage 90 and a hydraulic cylinder (not shown) for rotation about front wheel pivot points 80, FIG. 3, and tilt cylinders 92 for front wheel tilt. Front steerable wheels 58, 60 and/or rear driven traction devices 22, may include tracks, belts, or other traction devices as an alternative to wheels as is known in the art. The front wheels 58, 60 may also be driven, as is the case in motor graders provided with all wheel drive. For example, the power source may be operatively connected to a hydraulic pump (not shown) fluidly coupled to one or more hydraulic motors (not shown) associated with the front wheels 58, 60.

Figure 3:
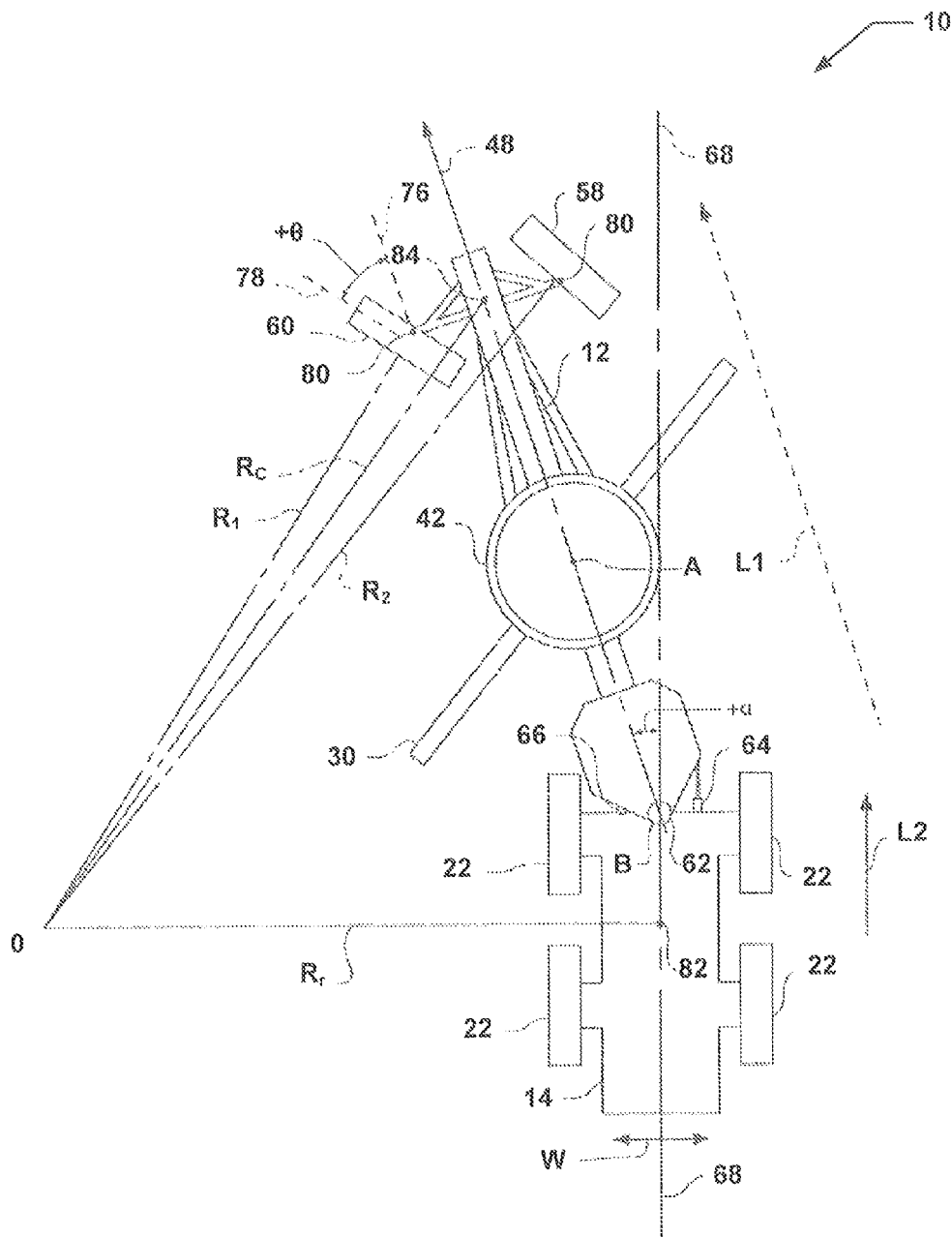
FIG. 3 is a schematic top view of a motor grader during an automatic articulation mode of operation in accordance with the present disclosure.

Referring to FIGS. 1 and 3, the motor grader 10 includes an articulation joint 62 that pivotally connects front frame 12 and rear frame 14. Both a right articulation cylinder 64 and left articulation cylinder 66 (FIG. 3) are connected between the front frame 12 and rear frame 14 on opposing sides of the motor grader 10. The right and left articulation cylinders 64, 66 are used to pivot the front frame 12 relative to the rear frame 14 about an articulation axis B (FIG. 1). In FIG. 2, the motor grader 10 is positioned in the neutral or zero articulation angle position wherein the longitudinal axis 48 of the front frame 12 is aligned with a longitudinal axis 68 of the rear frame 14.

FIG. 3 is a schematic top view of a motor grader 10 with the front frame 12 rotated at an articulation angle +α defined by the intersection of longitudinal axis 48 of front frame 12 and longitudinal axis 68 of the rear frame 14, the intersection corresponding with the position of articulation joint 62. In this illustration a positive α is indicative of a left articulation from the perspective of an operator facing forward, while a negative α (not shown) would be indicative of a right articulation. A front wheel steering angle +θ is defined between a longitudinal axis 76 parallel to the longitudinal axis 48 of front frame 12, and a longitudinal axis 78 of the front wheels 58, 60, the angle +θ having an origin at a pivot point 80 of the front wheels 58, 60. This is demonstrated in connection with left front wheel 60, but equally applies to right front wheel 58.

Figure 4:
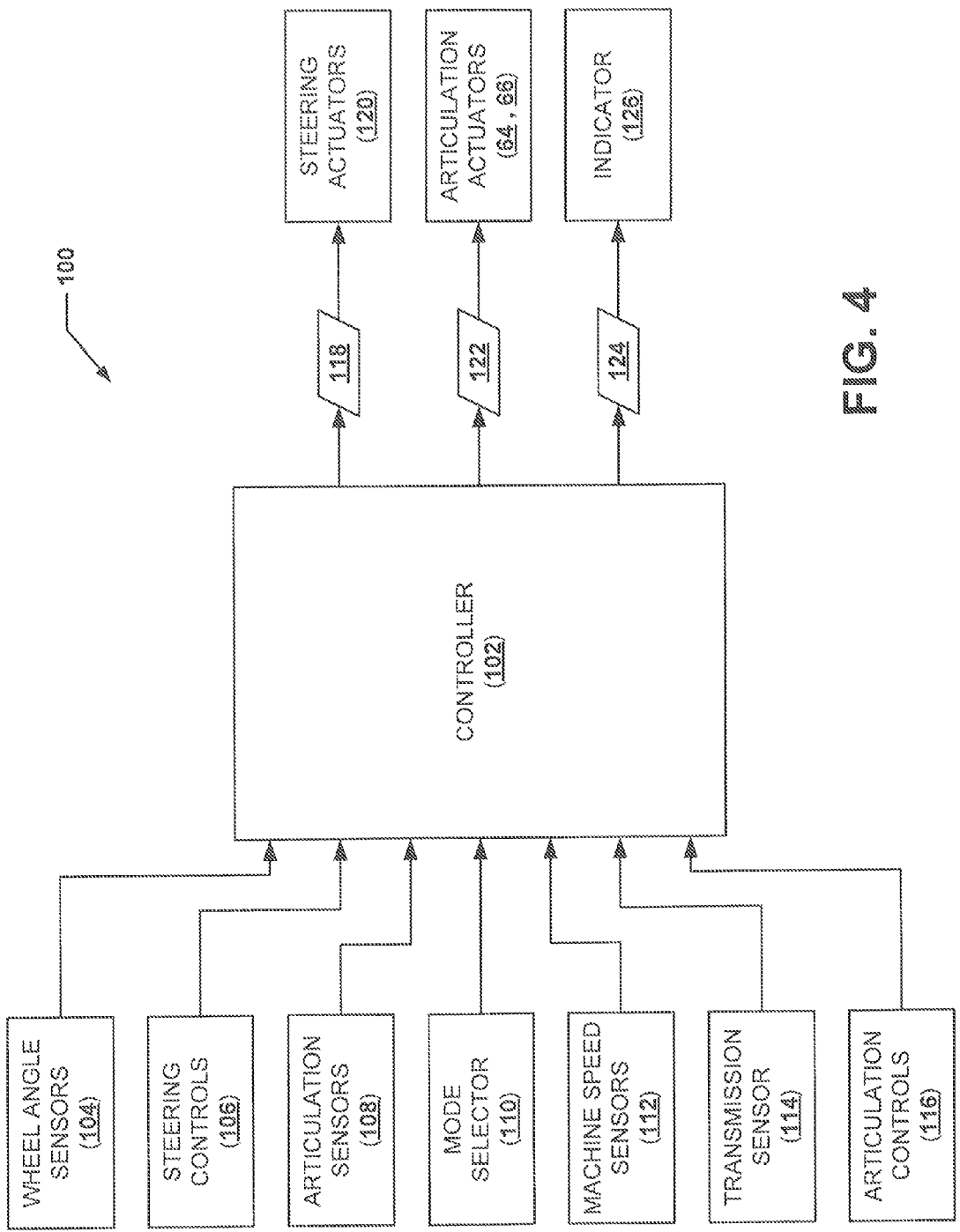
FIG. 4 is a block diagram of an exemplary steering control system in accordance with the present disclosure.

With reference now to FIG. 4, a block diagram of an exemplary steering control system 100 in accordance with an embodiment of the disclosure is provided. The control system 100 generally includes an electronic controller 102 configured, for example, via a control algorithm, to receive a plurality of instructions from various sensors and/or operator commands, and to responsively provide instructions to control various machine actuators and/or communicate with the machine operator. Controller 102 may include various components for executing software instructions designed to regulate various subsystems of the motor grader 10. For example, the controller 102 may include a central processing unit (CPU), a random access memory (RAM), a read-only memory (ROM), input/output elements, etc. The controller 102 may execute machine readable instructions stored in the controller 102 on a mass storage device, RAM, ROM, local memory, and/or on a removable storage medium such as a CD, DVD, and/or flash memory device.

The control system 100 may be configured to control machine articulation and to filter steering commands for machine articulation based upon operator control of the front wheel steering. Accordingly, the controller 102 may be configured to receive an indication of the front wheel steering angle θ. In some examples, the motor grader includes one or more steering angle sensors 104 that may be associated with one or both of the right and left front wheels 58, 60. In some such examples, the steering angle sensor 104 is configured to monitor the wheel steering angle θ by monitoring angles of rotation of steering linkages and/or pivot points at the front wheels.

The wheel angle sensors 104 may be configured to monitor the wheel steering angle by measuring the extension amount of an actuator (not shown), such as a hydraulic actuator, that controls the steering of front wheels 58, 60. Other sensor configurations are well known in the art. The steering sensors 104 may provide data "indicative of" the steering angle, which should be understood to mean direct measurements of the quantity or characteristic of interest, as well as indirect measurements, for example of a different quantity or characteristic having known relationships with the quantity or characteristic of interest.

The controller 102 may be configured to receive a signal from one or more operator steering controls 106 that may be employed to provide an indication of steering angle θ. These controls 106 may be, for example, a steering wheel 106 as shown in FIGS. 1-2, or any other type of operator input device, such as a dial, joystick, keyboard, pedal or other devices known in the art. In one embodiment, for example, a steering wheel sensor may be provided that senses the rotation or position of the steering wheel to provide an indication of steering angle θ.

One or more articulation sensors 108 may be employed to provide an indication of the articulation angle α at the axis B between the rear frame 14 and front frame 12. In some examples, the articulation sensor 108 is a pivot sensor disposed at articulation joint 62 to sense rotation at articulation axis B. Additionally or alternatively, the articulation sensor 108 may be configured to monitor the extension of right and/or left articulation cylinders 64, 66. Steering angle sensors 104 and articulation sensors 108 could be any type of sensor known in the art, including, for example, potentiometers, extension sensors, proximity sensors, angle sensors and the like.

Other inputs that may be associated with the control system 100 may include instructions provided from a mode selector 110 disposed, for example, in rear compartment 20, machine speed sensors 112, and transmission sensors 114. The mode selector 110 may be employed to select amongst various modes of operation including, for example, a standard operating mode, an automatic tracking mode, a tracking mode with steering angle limits, and an automatic articulation mode having a constant curve mode, discussed in more detail below. Machine speed sensors 112 may be any sensor configured to monitor machine travel speed, for example, sensors associated with any of the front wheels, rear wheels, axle shafts, motors, or other components of the drive train. A transmission sensor 114 may be associated with the transmission to provide an indication of a current gear or output ratio. Alternatively, an indication of current gear or output ratio may be provided by data associated with operator controls for the transmission (not shown).

Figure 5:
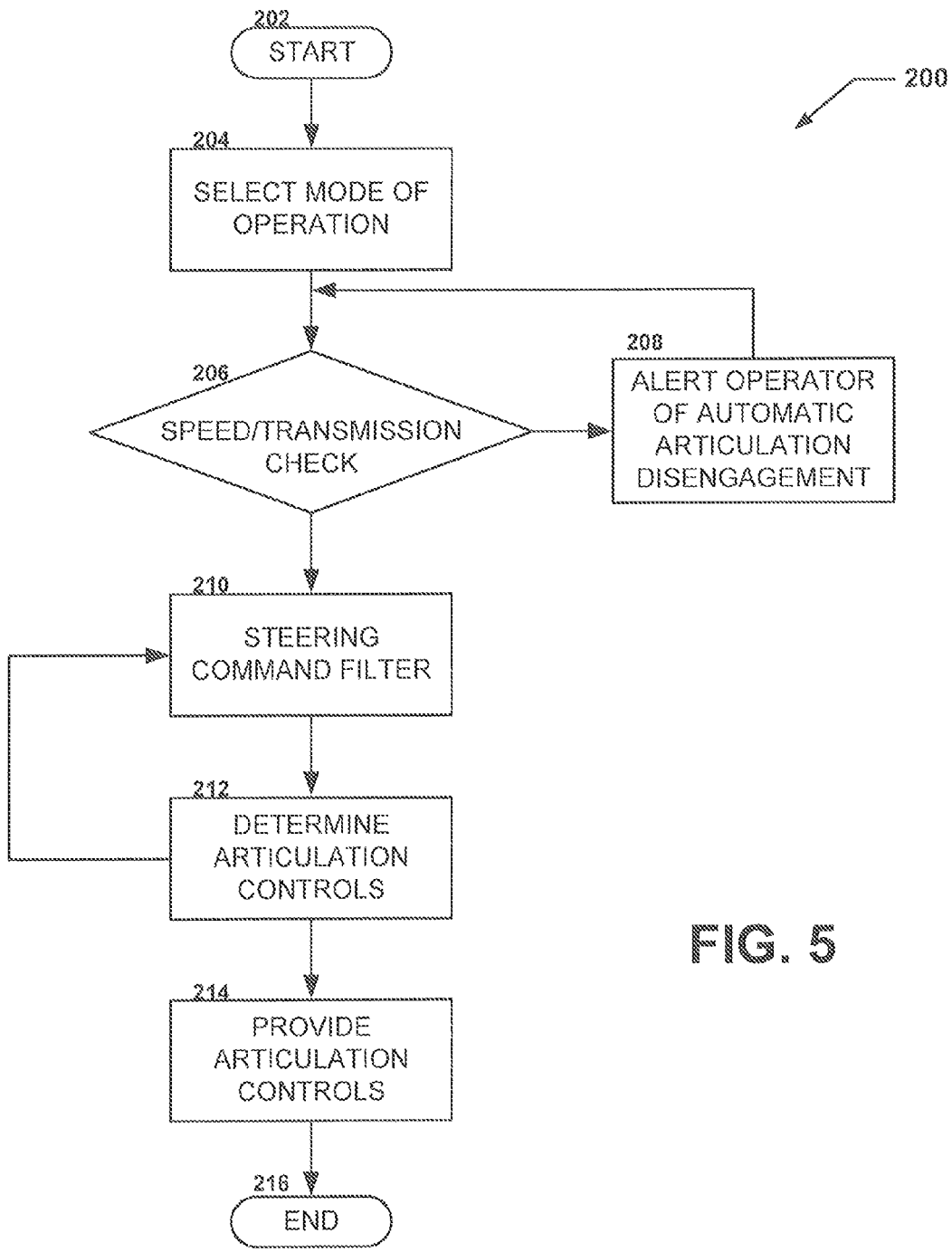
FIG. 5 is a flow chart depicting a process of implementing an automatic articulation mode having a steering command filter in accordance with an aspect of the present disclosure.

An exemplary control process 200 for controlling automatic articulation controls, as executed by the controller 102, is shown in flowchart format in FIG. 5. The control process 200 may begin at START 202, wherein the operator has started the machine for performing a grading operation that may include a curved travel path and/or contour, such as in a cul-de-sac operation shown in FIG. 8. During standard machine operations, the operator may manually operate both the steering controls 106 and articulation controls 116 to maneuver motor grader 10. Operator steering control instructions may be provided indirectly through the controller 102 that responsively provides steering control instructions 118 (FIG. 4) to control steering actuators 120. Similarly, operator articulation controls 116 may provide articulation instructions to the controller 102 that responsively provides articulation control instructions 122 to control articulation actuators 64, 66. Such control instructions may be, for example, pilot or electro-hydraulic signals that control operation of one or more pumps, motors, or valves of a hydraulic system that operates steering actuators 120 and/or articulation actuators 64, 66 as is well known in the art.

At STAGE 204, the operator may select a mode of operation for the steering control system 100. For example, mode selector 110 may allow the operator to select between a standard mode of operation, described above, or an automatic articulation control mode. For example, mode selector 110 may be a toggle switch or dial disposed in the operator station 20.

If the operator has selected an automatic articulation mode, at STAGE 206 the system may determine whether the machine is within a desired speed range or desired transmission gear or ratio to engage automatic articulation control. Controller 102 may be configured to receive signals indicative of a travel speed of the machine from one or more machine speed sensors 112 which the controller 102 may be configured to compare to a predetermined maximum speed or speed range. In the event that actual travel speed exceeds the maximum allowable speed or falls outside the speed range (for example, under 19 mph) the controller 102 may disengage automatic articulation control and/or may alert the operator by way of communication instructions 124 to indicator 126 that the automatic articulation feature is not activated or is disengaged, STAGE 208. In addition to, or in combination with, the travel speed determination, the controller 102 may also receive a signal from transmission sensor 114, and, if the transmission is found to be outside of a particular gear or output ratio range, for example above gears 1-4, the system may again proceed to STAGE 208 and disengage the automatic articulation and/or alert the operator. As used herein the output ratio refers to a ratio of the rotational speed upstream of the transmission to an output speed from the transmission.

At STAGE 210, the controller 102 receives input data indicative of steering angle and articulation angle from, for example, the steering angle sensors 104 and articulation sensor 108. In some examples, STAGE 210 may employ a steering correction filter which will intelligently decide when to turn "ON" and "OFF" to remove small to medium steering corrections in cul-de-sac or other curves while avoiding delay when the machine is making a turn.

Figure 6:
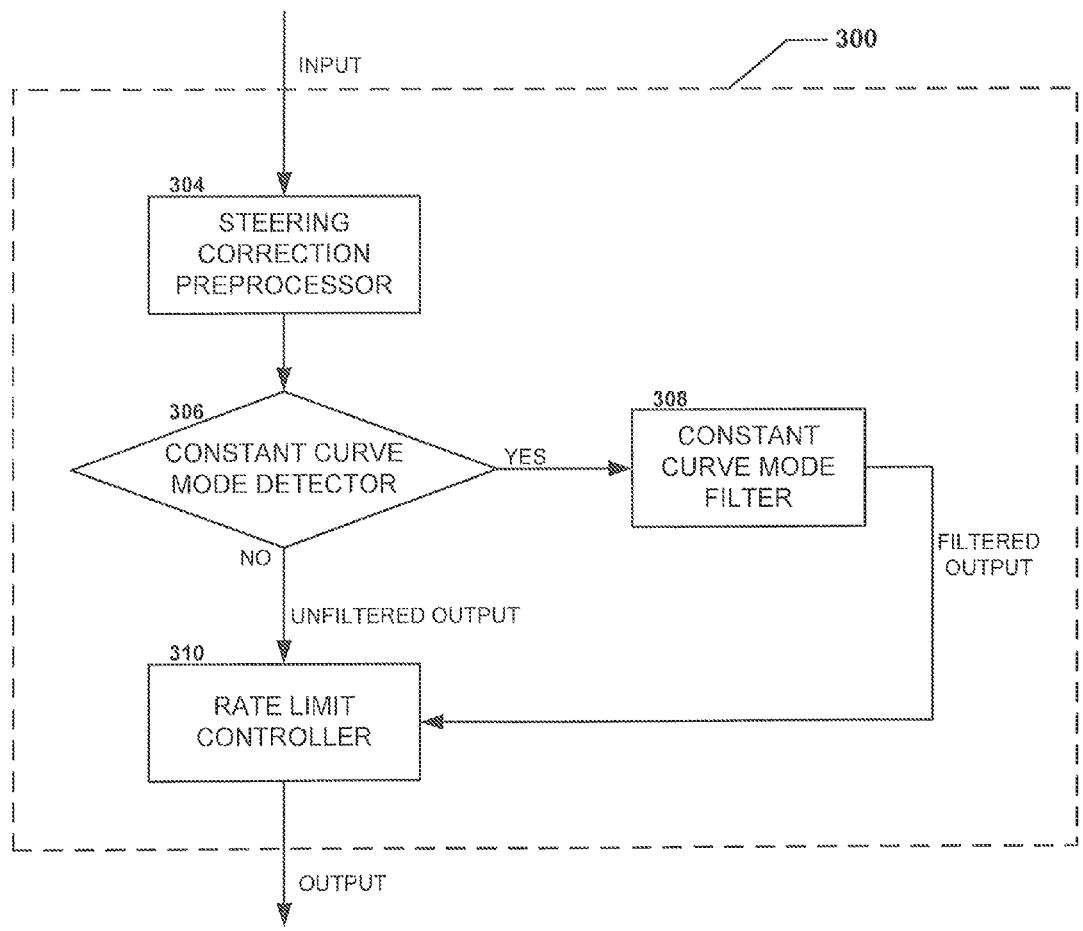
FIG. 6 is a flow chart depicting a process of implementing a steering command filter in accordance with the process of FIG. 5.
Figure 7:
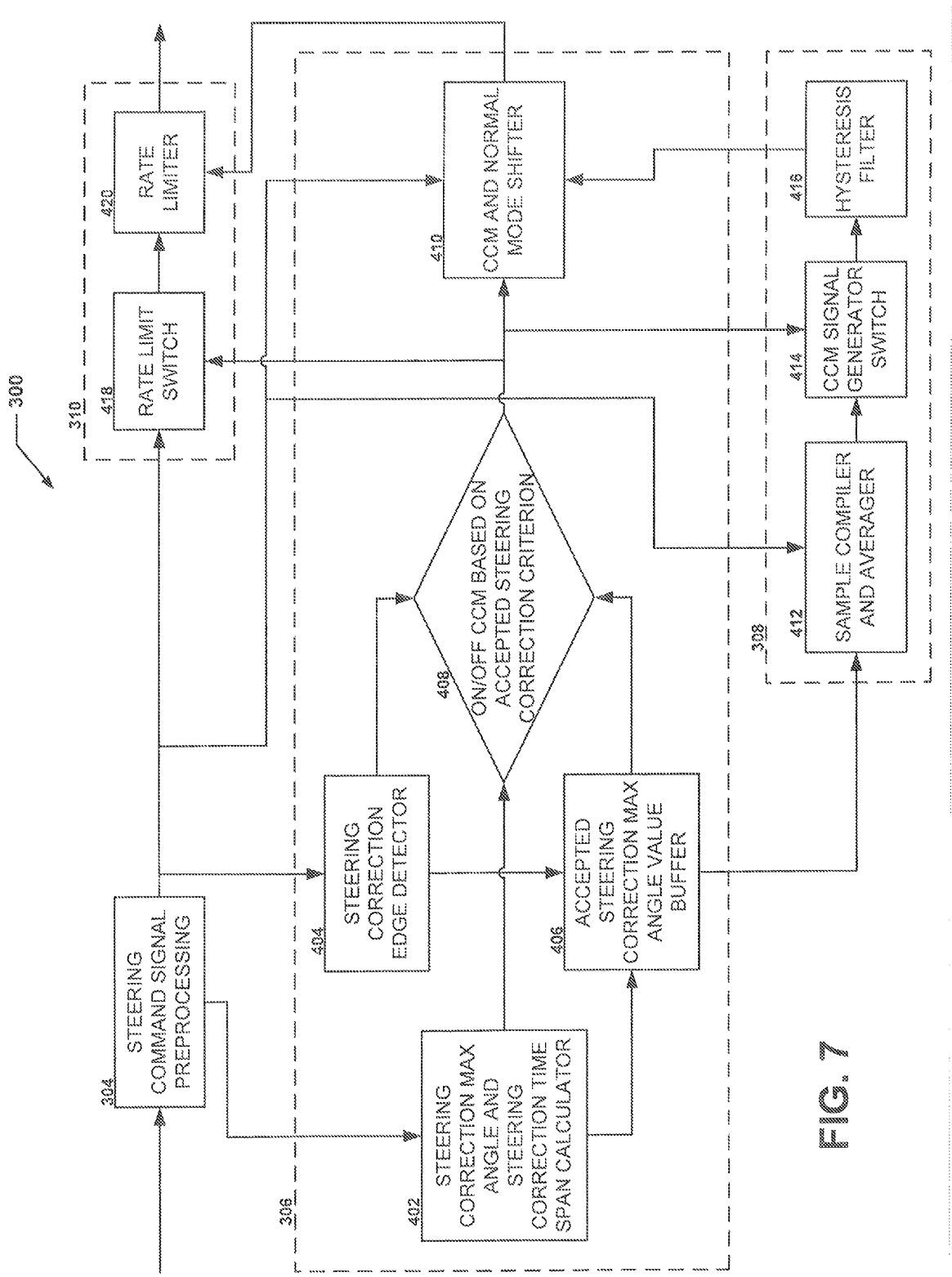
FIG. 7 is a flow chart depicting an example embodiment of the process of implementing a steering command filter in accordance with FIG. 6.

With reference to FIGS. 6-7, exemplary methods for employing a steering correction filter 300 in accordance with STAGE 210 are described. As will be described in further detail below, the steering correction filter 300 receives input data indicative of steering angle and articulation from, for example, the steering angle sensors 104 and articulation sensors 108.

Using steering correction pre processor 304, the steering correction filter 300 provides initial filtering of the correction data received. In some embodiments, pre processing of the steering and articulation data received may be necessary to filter out noise from the input data. Such data noise may be, for example, very minor changes in steering angle not caused by a user command, but rather, detected by the steering angle sensors 104 from vibrations felt in an associated apparatus. In some embodiments, noise may be filtered using at least one of a low pass filter, hysteresis filter, and/or any other filter suitable for removing said noise. Such noise may need to be filtered from the instructions to, for example, avoid excessive edge detection in by the steering correction edge detector 404.

The steering correction filter 300 may output the resultant steering corrections of the steering correction pre processor 304 to the constant curve mode detector 306. The constant curve mode detector 306 will determine whether the output data of the steering correction pre processor 304 suggests that the controller 102 should enter the constant curve mode (CCM). In some examples, the steering correction filter 300 may employ steering correction edge detector 404. Steering correction edge detection 404 locates steering angle corrections in real time and/or when a machine (e.g., the motor grader 10) makes a turn. An "edge," to be detected, is a change in angle; for example, a change from an angle steering right to an angle steering left. The edges detected in the example steering correction graph 400 are denoted by the roman numerals I-V in FIG. 9.

In some examples, when an edge is detected by the steering correction edge detector 404, the steering correction filter 300 will determine the steering correction angle ($\Delta S$) and the steering correction time span ($\Delta T$) using the steering correction max angle and steering correction time span calculator 402. The determined $\Delta S$ and $\Delta T$ of the calculator 402 may be used for further processing by the steering correction filter 300. Further, in some examples, executing the constant curve mode detection in accordance with the constant curve mode detector 306 may include use of a steering correction maximum angles values buffer 406 to store maximum angle values for a series of accepted steering corrections associated with entering constant curve mode and determined from situational and/or experimental data.

Using information collected and/or processed the calculator 402, the steering correction edge detector 404, and/or the buffer 406, the steering command filter 300 may determine a constant curve mode decision based on accepted steering corrections criterion at decision 408. At decision 408, the filter will determine that the system should turn the constant curve mode "ON" if there are n number of consecutively made steering corrections whose change in steering angle ($\Delta S$) and steering correction time span ($\Delta T$) lie within the range for accepted steering corrections. When n consecutive, acceptable, steering corrections are recorded, constant curve mode is switched "ON." For example, constant curve mode may be turned on if 5 (n) consecutive steering corrections are made having a change in steering angle less than 12 degrees ($\Delta S$) wherein the correction time span is less than one second ($\Delta T$). Such parameters for n, $\Delta S$, and $\Delta T$ may be any suitable values to perform a constant curve articulation operation and the parameters may be tunable by an operator and/or designer.

When constant curve mode is "ON" as a result of the constant curve mode detector 306, the steering correction input data will enter the constant curve mode filter 308. The constant curve mode filter will compile and average the last n steering correction samples using the sample compiler and averager 412. Output of the sample compiler and averager 412 may be an average angular value for the n samples of steering correction values input. The constant curve mode filter may further employ a constant curve mode signal generator switch 414 to alert the operator, via output of the controller 102, that the machine 10 is in constant curve mode. The data may then be filtered using any number of digital filters including, but not limited to, a hysteresis filter 416. The constant curve mode signal generator switch 414 may be used to turn ON the input signal to the hysteresis filter 416 and/or any other filters; thusly, the switch prevents the hysteresis filter 416 from using larger steering corrections in producing output. The switch 414 may ensure that n consecutive accepted steering corrections are observed by the hysteresis filter 416.

If any detected value for $\Delta S$ and/or $\Delta T$ exceeds range for accepted steering corrections, the decision 408 will send the command for switching "OFF" of constant curve mode and clear the buffer 406 of consecutive accepted steering corrections. The time threshold used may be a function of the speed of the machine detected by the machine speed sensors 112. In some examples, constant curve mode will be switched "OFF" because the steering correction detected exceeds the threshold for constant curve mode; for example, when a motor grader 10 takes a turn over an example threshold of 12 degrees. In some other examples, constant curve mode will be switched off because the time taken to make the steering correction exceeds the time threshold. For example, the motor grader 10 may be taking an exit off of a highway; during such turns, the steering correction angle may be less than an example threshold of 12 degrees, however, the correction is held for a timespan much longer than one second. Once a time threshold is reached, constant curve mode is determined to switch "OFF" and is disengaged.

Unfiltered output of the constant curve mode detector 306 and/or filtered output of the constant curve mode filter may be processed by a rate limit controller 310 prior to output as steering correction instructions. In some examples, if at any time the machine 10 is in the middle of a turn and the change in steering correction exceeds the steering correction angle threshold, constant curve mode will immediately be shut off. As a result, there may be a step command executed to reach the input, non-filtered, steering correction. Such a step command may cause a jerk in the operation of the machine 10. Therefore, in order to avoid the step command and any consequences thereof, the rate limit controller 310 will engage (using a rate limit switch 418) whenever constant curve mode is turned off. The rate limit controller 310 will employ the rate limiter 420 to limit the step function created by the switching off of the constant curve mode and avoid any jerking in the operation of the machine 10 caused by the step function.

Parameters used by the steering correction filter 300 may be tunable by the operator and/or the designer of the motor grader 10. In some examples, tunable parameters may include preprocessing filter factors, accepted steering correction angle threshold ($\Delta S$), accepted steering correction time threshold ($\Delta T$), the number of consecutive accepted steering corrections required to turn "ON" constant curve mode (n), constant curve mode filter factors, and/or rate limit parameters. In an exemplary embodiment, the accepted steering correction time threshold ($\Delta T$) is based on machine speed and may be actively tuned. For example, wherein g is ground speed of the motor grader 10, r is the tire radius (e.g., the radius of wheels 58, 60), s is the known distance after which constant curve mode should be turned off, and N is a required measure of the revolutions of the wheels 58,60 of the motor grader 10 before it exits the Constant Curve Mode:

g and N are known and $g = \frac{s}{\Delta T}$, and $s = N 2\pi r$, therefore, $g = N 2\pi r / \Delta T$, and $\Delta T = \frac{N 2\pi r}{g}$.

At STEP 212, the controller 102 employs the output from STEP 210 to determine a desired articulation angle based upon front wheel steering. For example, as illustrated in FIG. 3, during front wheel steering, each of the front wheels 58, 60 has a separate turning radius, left front wheel 60 having a turning radius $R_1$ and right front wheel 58 having a turning radius $R_2$ from origin O. Steering angle $\theta$ may be based upon either a steering angle for the right front wheel 60 or left front wheel 58. However, in an embodiment, a centerline steering angle $\theta_c$ may be calculated by controller 102 that is an average of right and left steering angles in the event that some variation or error exists based upon, for example, wheel misalignment or sensor errors.

The tandem arrangement of rear tires 22 behaves equivalently to a machine including a single wheel on each side of the machine, the hypothetical wheel being disposed at the center of each tandem 24. Thus, the automatic articulation algorithm may be configured such that a rear centerline point 82, a point 82 disposed equidistant from a midpoint of the two opposing tandems 24, will track the front centerline point 83 between the pivot points 80 of the front wheels 58, 60. That is, a front centerline point 84 being a midpoint of a line connecting the pivot points 80 of the right and left front wheels 58, 60.

The turning radius at the front centerline point 84 of the front frame 12, Rc, is given by equation (1):

$R_c = (L_2 + L_1 \cos \alpha)/(\sin(\theta_c + \alpha))$ wherein $L_1$ is the distance between articulation joint 62 and front centerline point 84, $L_2$ is the distance between articulation joint 62 and rear centerline point 82, and $\alpha$ is the articulation angle.

The turning radius at the centerline point 82 of the rear tandem, Rr, is given by the equation (2):

$$R_r = \frac{L_2 + L_1 \cos \alpha}{(\tan(\theta_c + \alpha))} + L_1 \sin \alpha.$$

The controller receives an indication of the front wheel steering angle and commands an articulation angle that will cause Rc and Rr to be equivalent, thus causing the rear tires 22 to follow the track of the front tires 58, 60 as shown in FIG. 8 as the motor grader moves around a curve. Using one equation, for example, the controller may solve for a desired articulation angle for a given steering angle as given by equation (3):

$$\alpha = \arctan\left(\frac{(L_1^2 - L_2^2)\sin(\theta_c)}{(L_1^2 + L_2^2)\cos(\theta_c) - 2L_1 L_2}\right)$$

If there is a needed adjustment of articulation angle $\alpha$, the controller 102 may proceed to STAGE 214, or, if no adjustment is needed, the system may continue monitoring based on the filtered steering commands at STAGE 210 as shown.

It should be appreciated by one of skill in the art that this equation may be modified, for example, to employ a radius from other points on the machine, for example, by using a first radius from pivot point 80 of the left front tire 60 to track a point associated with a rear tire 22 on the left tandem, L1 and L2 being adjusted accordingly. In an alternative embodiment, the controller 102 may be provided with one or more maps or look-up tables that include pre-determined relationships between steering angle $\theta$ and articulation angle $\alpha$ based upon known machine geometries. Such look-up-tables or maps may be pre-made or stored in or downloaded into the memory of controller 102.

At STEP 214, the controller will provide articulation control signals 122 to control articulation cylinders 64, 66 in accordance with the desired articulation angle $\alpha$ based upon the determinations of STEP 212. While the controller is commanding articulation, the system may also provide a positive indicator 126, such as a green light or other indicator 126 that automated articulation control is functioning. The rate at which articulation occurs may be based upon, for example, the travel speed of the machine, provided again by speed sensor 112, which may be compared to one or more tables or maps provided to the controller 102. The controller 102 may then be configured to provide control instructions 122 to combine both a desired articulation angle α and a rate of movement of actuators 64, 66, by, for example, controlling a flow rate associated therewith. In some examples, the speed at which articulation occurs increases as the travel speed of the machine increases.

At STEP 216, the operator may use the mode selector to turn off the automatic articulation mode. Additionally or alternatively, automatic articulation may be disengaged when the machine is within a certain range of a neutral position wherein both the articulation angle and front wheel steering angles approach zero, when the machine exceeds a designated travel speed, a particular gear or gear ratio, the machine is placed in reverse, brakes are applied, the operator commands articulation manually, or the machine is stationary for a given period of time.

INDUSTRIAL APPLICABILITY

The present disclosure relates generally to a method of improving steering control for an articulated machine having front wheel steering. In particular, the system has application for work equipment such as motor graders wherein the operator needs to closely control a variety of complex machine functions, such as blade control, while maneuvering the machine in a curved trajectory. In general, the disclosed systems receive steering commands from the operator, and, based upon the steering command or signals indicative of front wheel steering angle, filter the steering controls and automatically command articulation so that the front wheels track the rear wheels of the machine. This has particular application in connection with cul-de-sac operations such as that depicted in FIG. 6, wherein the operator uses front steering control to guide the machine around the cul-de-sac while operating the blade 30 to achieve the desired grade, the automatic articulation with steering angle filtering function controlling articulation of the rear frame 14 to avoid striking obstacles such as the curb 224.

The automatic articulation mode with steering control filtering is instantiated and executed via the computerized execution of instructions stored on a nontransitory computer-readable medium or memory, e.g., a disc drive, flash drive, optical memory, ROM, etc. The executing entity may be one or more controllers and may be separate from or part of one or more existing controllers such as one or more engine controllers and/or transmission controllers.

It will be appreciated that the present disclosure provides a system and method for facilitating an automatic articulation mode with constant curve mode to improve machine performance. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method of operating a motor grader having steerable front wheels and a front and rear frame pivotally connected at an articulation joint, comprising:
    selecting an automatic articulation mode, the automatic articulation mode having a constant curve mode;
    propelling the motor grader along a direction of travel;
    commanding front wheel steering to turn the motor grader;
    providing a plurality of front wheel steering corrections to an electronic controller;
    filtering the plurality of front wheel steering corrections using a method for filtering steering corrections based on the constant curve mode, wherein the method generates filtered front wheel steering corrections; and
    automatically commanding articulation of the front frame relative to the rear frame about the articulation joint in response to the filtered front wheel steering corrections.

2. The method of claim 1, wherein the method for filtering steering corrections comprises:
    receiving n front wheel steering corrections from the plurality of front wheel steering corrections;
    determining if an angular measure for each of the n front wheel steering corrections from the plurality of front wheel steering corrections are within an acceptable steering correction angular range associated with the constant curve mode; and
    determining if a timespan of each member of the n front wheel steering corrections from the plurality of front wheel steering corrections are within an acceptable timespan range associated with the constant curve mode.

3. The method of claim 2, wherein the method for filtering steering corrections comprises engaging the constant curve mode if the angular measure for each of the n front wheel steering corrections from the plurality of front wheel steering corrections are within an acceptable steering correction angular range associated with the constant curve mode and the timespan of each member of the n front wheel steering corrections from the plurality of front wheel steering corrections are within an acceptable timespan range associated with the constant curve mode.

4. The method of claim 2, wherein the filtered front wheel steering corrections are based on an average of angular values of the n front wheel steering corrections from the plurality of front wheel steering corrections.

5. The method of claim 2, wherein the method for filtering steering corrections comprises preprocessing the plurality of front wheel steering corrections for noise removal.

6. The method of claim 5, wherein the preprocessing of the plurality of front wheel steering corrections for noise removal comprises filtering the plurality of front wheel steering corrections using a hysteresis filter.

7. The method of claim 2, wherein the method for filtering steering corrections comprises rate limiting the filtered steering corrections.

8. The method of claim 1, wherein automatically commanding articulation of the front frame comprises comparing the front wheel steering corrections to stored values associating articulation with steering angle stored in a memory of the controller.

9. The method of claim 1, further comprising communicating a notification when the motor grader has entered automatic articulation mode.

10. The method of claim 1, further comprising monitoring a machine speed of the motor grader using a machine speed sensor, wherein the automatic articulation mode is disengaged when the machine speed is above a desired machine speed.

11. A method for filtering a plurality of front wheel steering corrections associated with a motor grader, the method associated with an electronic controller associated with the motor grader, the electronic controller configured to control the motor grader in an automatic articulation mode, wherein the automatic articulation mode comprises a constant curve mode, the method comprising:
    receiving n front wheel steering corrections from the plurality of front wheel steering corrections;

determining if an angular measure for each of the n front wheel steering corrections from the plurality of front wheel steering corrections are within an acceptable steering correction angular range associated with the constant curve mode; and determining if a timespan of each member of the n front wheel steering corrections from the plurality of front wheel steering corrections are within an acceptable timespan range associated with the constant curve mode.

12. The method of claim 11, further comprising engaging the constant curve mode if the angular measure for each of the n front wheel steering corrections from the plurality of front wheel steering corrections are within an acceptable steering correction angular range associated with the constant curve mode and the timespan of each member of the n front wheel steering corrections from the plurality of front wheel steering corrections are within an acceptable timespan range associated with the constant curve mode.

13. The method of claim 11, further comprising disengaging the constant curve mode if the angular measure for at least one of the n front wheel steering corrections from the plurality of front wheel steering corrections is outside an acceptable steering correction angular range associated with the constant curve mode.

14. The method of claim 11, further comprising disengaging the constant curve mode if the timespan of at least one member of the n front wheel steering corrections from the plurality of front wheel steering corrections are outside of an acceptable timespan range associated with the constant curve mode.

15. The method of claim 11, wherein the constant curve mode produces filtered steering angle corrections based on an average angular value of the n front wheel steering corrections.

16. The method of claim 11, wherein the constant curve mode is calibrated to engage when the motor grader operates on a cul-de-sac path.

17. The method of claim 11, wherein the acceptable timespan range associated with the constant curve mode is based on a machine speed of the motor grader.

18. The method of claim 17, wherein the acceptable timespan range associated with the constant curve mode ($\Delta T$) is defined by an equation as follows:

$$\frac{N2\pi r}{g} = \Delta T,$$

wherein g is a machine speed of the motor grader, r is a radius of a front wheel, and N is a required measure of revolutions of a wheel of the motor grader before the motor grader exits the constant curve mode.

19. A motor grader having an automatic articulation mode including a constant curve mode, the motor grader comprising:
one or more steerable front wheels mounted on a front portion of the motor grader;
one or more steerable wheels attached to a rear portion of the motor grader that may be articulated relative to the front portion; and
a controller configured for receiving a plurality of front wheel steering corrections and in response generating a steering correction to steer the one or more front wheels, wherein the plurality of front wheel steering corrections are filtered using a method for filtering steering corrections based on a constant curve mode, wherein the method generates filtered front wheel steering corrections, and automatically commanding articulation of the one or more steerable wheels attached to the rear portion in response to the filtered front wheel steering corrections.

20. The method of claim 19, wherein the method for filtering steering corrections based on a constant curve mode comprises:
receiving n front wheel steering corrections from the plurality of front wheel steering corrections;
determining if an angular measure for each of the n front wheel steering corrections from the plurality of front wheel steering corrections are within an acceptable steering correction angular range associated with the constant curve mode; and
determining if a timespan of each member of the n front wheel steering corrections from the plurality of front wheel steering corrections are within an acceptable timespan range associated with the constant curve mode.

* * * * *